United States Patent
Bae et al.

(10) Patent No.: US 10,649,811 B2
(45) Date of Patent: May 12, 2020

(54) SUNDER MANAGEMENT FOR A CLUSTER OF DISPERSE NODES

(71) Applicant: International Business Machines Corporation, Armonk, NY (US)

(72) Inventors: Myung M. Bae, Pleasant Valley, NY (US); Robert K. Gardner, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 15/294,681

(22) Filed: Oct. 15, 2016

(65) Prior Publication Data

US 2018/0107390 A1   Apr. 19, 2018

(51) Int. Cl.
*G06F 15/16*   (2006.01)
*G06F 9/50*    (2006.01)

(52) U.S. Cl.
CPC ...... *G06F 9/5027* (2013.01); *G06F 2209/505* (2013.01)

(58) Field of Classification Search
None
See application file for complete search history.

(56) References Cited

U.S. PATENT DOCUMENTS

| | | | |
|---|---|---|---|
| 6,192,401 B1 | 2/2001 | Modiri et al. | |
| 6,662,219 B1 | 12/2003 | Nishanov et al. | |
| 7,039,694 B2 | 5/2006 | Kampe et al. | |
| 7,464,378 B1 | 12/2008 | Limaye et al. | |
| 7,870,230 B2 | 1/2011 | Rao et al. | |
| 8,650,281 B1 | 2/2014 | Toley et al. | |
| 2010/0306573 A1* | 12/2010 | Gupta | G06F 11/1425 714/4.1 |
| 2010/0318610 A1* | 12/2010 | Hisgen | G06F 11/0709 709/205 |
| 2012/0239814 A1* | 9/2012 | Mueller | G06F 9/5061 709/226 |
| 2013/0039166 A1* | 2/2013 | Brown | H04L 41/0659 370/216 |
| 2016/0219117 A1* | 7/2016 | Marlatt | G06F 9/5027 |
| 2017/0116095 A1* | 4/2017 | Schatz | G06F 11/2033 |
| 2017/0123663 A1* | 5/2017 | Panasko | G06F 3/0659 |
| 2017/0318092 A1* | 11/2017 | Maredia | H04L 67/1097 |

OTHER PUBLICATIONS

Mell, Peter, et al., The NIST Definition of Cloud Computing, National Institute of Standards and Technology, Oct. 7, 2009, Version 15, NIST, Gaithersburg, MD, US.
Microsoft; "What's New in Failover Clustering in Windows Server"; <https://technet.microsoft.com/en-us/library/dn265972.aspx>.

* cited by examiner

*Primary Examiner* — Brian Whipple
*Assistant Examiner* — Anthony T Rotolo
(74) *Attorney, Agent, or Firm* — Edward J. Wixted, III

(57) ABSTRACT

Disclosed aspects relate to sunder management with respect to a shared pool of configurable computing resources having a cluster of disperse nodes. A set of sunder event response prioritization data may be determined based on a set of cluster profile data for the cluster of disperse nodes. A sunder event which indicates a partitioned status may be detected with respect to the cluster of disperse nodes. The set of sunder event response prioritization data may be examined. In response to detecting the sunder event, a sunder event response operation may be performed to maintain asset availability.

20 Claims, 10 Drawing Sheets

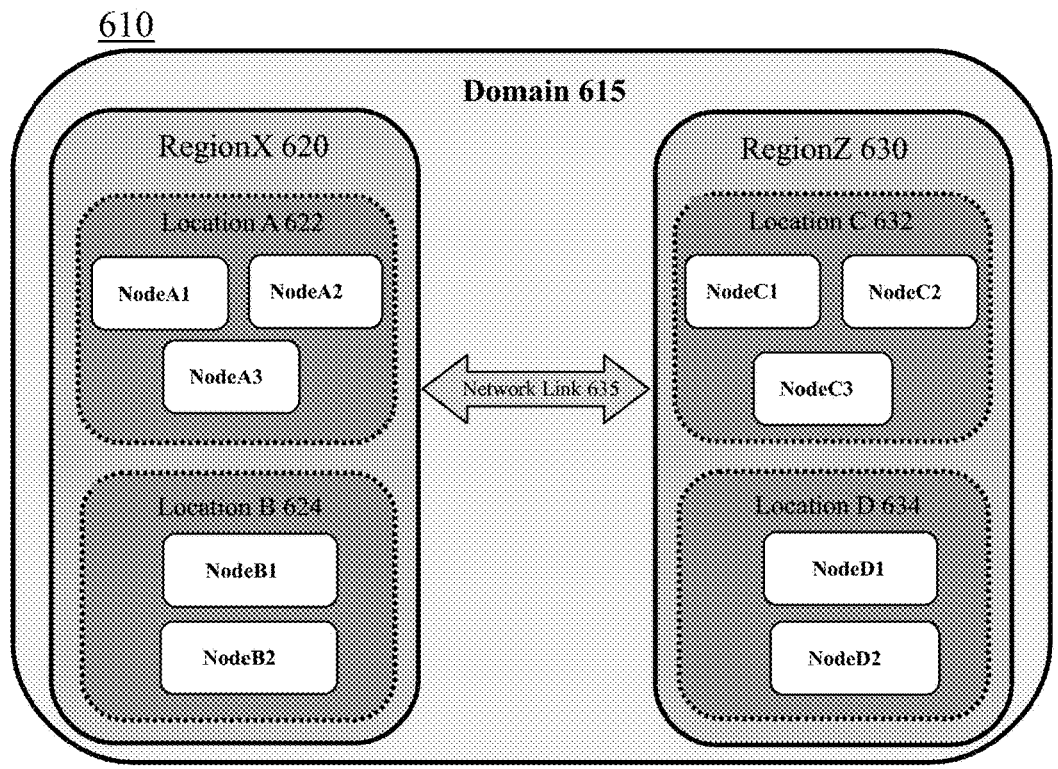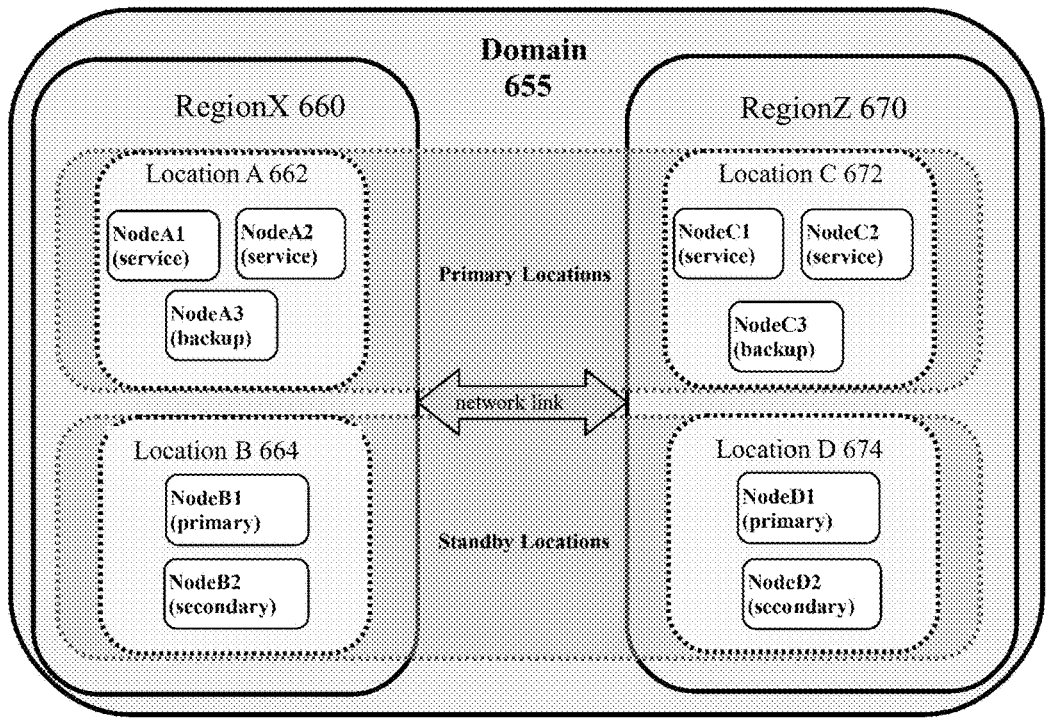
FIG. 6

700

| Group | Members | Role | Priority |
|---|---|---|---|
| Domain | PrimaryLocations | Primary | 1 |
|  | StandbyLocations | Standby | 2 |
| PrimaryLocations | LocationA | Primary | 1 |
|  | LocationC | Primary | 1 |
| StandbyLocations | LocationB | Standby | 2 |
|  | LocationD | Standby | 2 |
| LocationA | NodeA1 | Service | 1 |
|  | NodeA2 | Service | 1 |
|  | NodeA3 | Backup | 2 |
| LocationB | NodeB1 | Primary | 1 |
|  | NodeB2 | Secondary | 2 |
| LocationC | NodeC1 | Service | 1 |
|  | NodeC2 | Service | 1 |
|  | NodeC3 | Backup | 2 |
| LocationD | NodeD1 | Primary | 1 |
|  | NodeD2 | Secondary | 1 |

| Pref. | Groups or Nodes | Explanation |
|---|---|---|
| 1 | Primary Locations | Highest priority in topmost group |
| 2 | LocationA or LocationB | Identical Priorities w/in Primary Locations |
| 3 | NodeA1, NodeA2, NodeC1, NodeC2 | Highest Priorities across their containing and peer groups in the hierarchy |
| 4 | NodeA3, NodeC3 | Second highest priority in LocationA and LocationB |
| 5 | Standby Locations | Second highest priority in the topmost group |
| 6 | LocationC or LocationD | Identical Priorities w/in standby locations |
| 7 | NodeB1, NodeD1, NodeD2 | Highest Priorities across their containing and peer groups in the hierarchy |
| 8 | NodeB2 | Lowest Priority in hierarchy |

| Group | Members | Priority | Role |
|---|---|---|---|
| Domain | LocationA | 2 | Secondary |
| | LocationB | 3 | Backup |
| | LocationC | 1 | Primary |
| LocationA | node1 | 1 | Primary |
| | node2 | 2 | Secondary |
| | node3 | 0 | Non-TB backup |
| LocationB | node4 | 1 | Primary |
| | node5 | 2 | Secondary |
| LocationC | node6 | 1 | Primary |
| | node7 | 1 | Primary |
| | node8 | 2 | Secondary |

1000

1050

| Group | Members | Priority | Role |
|---|---|---|---|
| Domain | Region1 | 1 | Primary |
|  | LocationC | 2 | Backup |
| Region1 | LocationA | 1 | Service |
|  | LocationB | 1 | Service |
| LocationA | node1 | 1 | Primary |
|  | node2 | 2 | Secondary |
| LocationB | node3 | 1 | Primary |
|  | node4 | 2 | Secondary |
| LocationC | node6 | 1 | Standby |
|  | node7 | 1 | Standby |
|  | node8 | 1 | Standby |

SUNDER MANAGEMENT FOR A CLUSTER OF DISPERSE NODES

BACKGROUND

This disclosure relates generally to computer systems and, more particularly, relates to sunder management with respect to a shared pool of configurable computing resources having a cluster of disperse nodes. The amount of data that needs to be managed by compute node cluster environments is increasing. Data management in cluster environments may be desired to be performed as efficiently as possible. As data needing to be managed increases, the need for sunder management in compute node cluster environments may increase.

SUMMARY

Aspects of the disclosure relate to sunder management with respect to a shared pool of configurable computing resources having a cluster of disperse nodes. Network topology modifications may result in changes to the physical and logical groupings of compute nodes in compute node cluster environments. A hierarchical priority of one or more nodes of the disperse computing cluster may be defined. The hierarchical priority may be used to maintain continuous ownership of a tiebreaker by a preferred member of the computing cluster. Tiebreaker ownership may determine operational quorum and resource/workload management characteristics for a compute node or group of compute nodes within the cluster. The tiebreaker may by dynamically relocated to a preferred node group to retain service in case of a sunder, merge, cluster partition, or other network topology change. Leveraging sunder management techniques may be associated with performance, efficiency, and service availability for a disperse computing cluster.

Disclosed aspects relate to sunder management with respect to a shared pool of configurable computing resources having a cluster of disperse nodes. A set of sunder event response prioritization data may be determined based on a set of cluster profile data for the cluster of disperse nodes. A sunder event which indicates a partitioned status may be detected with respect to the cluster of disperse nodes. The set of sunder event response prioritization data may be examined. In response to detecting the sunder event, a sunder event response operation may be performed to maintain asset availability.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 shows a set of example cluster topologies for sunder event management, according to embodiments.

FIG. 7 shows an example priority mapping table for a disperse cluster of nodes, according to embodiments.

FIG. 8 shows an example selection priority table for a cluster of disperse nodes, according to embodiments.

Figure 1:
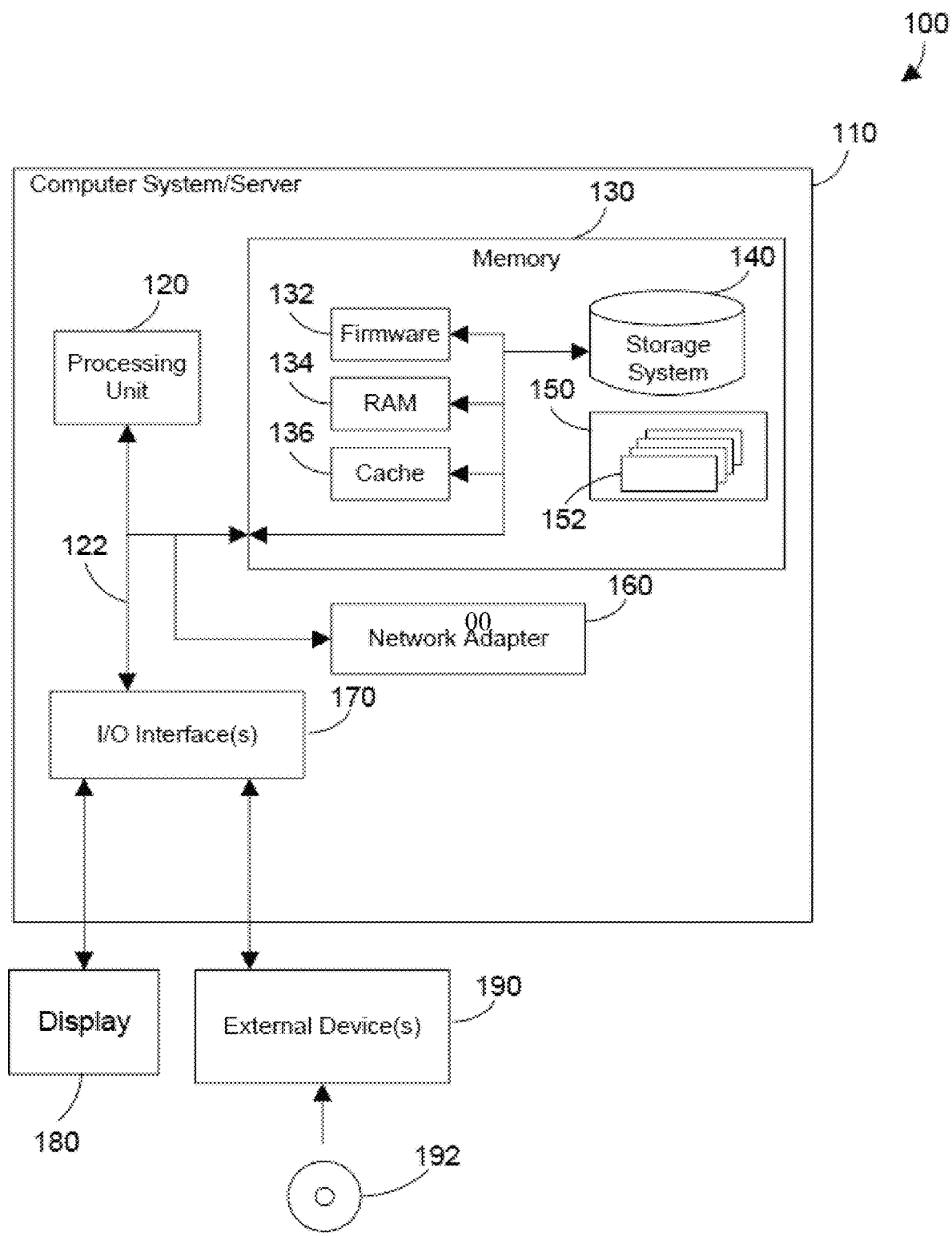
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to sunder management with respect to a shared pool of configurable computing resources having a cluster of disperse nodes. Network topology modifications (e.g., cluster partitioning, merges, sunders) may result in changes to the physical and logical groupings of compute nodes in compute node cluster environments. A hierarchical priority (e.g., sunder event response prioritization data) of one or more nodes of the disperse computing cluster may be defined. The hierarchical priority may be used to maintain continuous ownership of a tiebreaker (e.g., set of tiebreaker ownership indicators) by a preferred member of the computing cluster. Tiebreaker ownership may determine operational quorum and resource/workload management characteristics for a compute node or group of compute nodes within the cluster. The tiebreaker may by dynamically relocated to a preferred node group to retain service in case of a sunder, merge, cluster partition, or other network topology change. Leveraging sunder management techniques may be associated with performance, efficiency, and service availability for a disperse computing cluster.

Complex high availability clustering environments may consist of groups of nodes distinguished by logical association or physical location. Network and node failures in functionally or geographically distributed cluster configurations may introduce sunder, merge, and other cluster partition events as the boundaries that exist between groups of nodes shift. When sunder events occur, the cluster infrastructure may take action to protect shared resources and avoid disruption of application service. This may involve deciding the "winning" side of a sunder in order to take protective measures such as fencing or halting nodes on the losing side of the partition, assuming management of workloads or applications from other nodes, or performing other cluster maintenance tasks. Aspects of the disclosure relate to the recognition that, in some situations, the winning side of a sunder is decided arbitrarily, resulting in a potentially inefficient cluster configuration. Accordingly, aspects of the disclosure relate to defining a hierarchy for nodes within the cluster based on their functionality, computational capabilities, service role, and other factors, and using the hierarchy to determine ownership of a tiebreaker (e.g., designated winner in the event of a sunder). In this way, sunder events may be resolved on a per-cluster basis consistent with the configuration of the cluster to maintain application continuity and service availability.

Aspects of the disclosure include a method, system, and computer program product for sunder management with respect to a shared pool of configurable computing resources having a cluster of disperse nodes. A set of sunder event response prioritization data may be determined based on a set of cluster profile data for the cluster of disperse nodes. In response to determining the set of sunder event prioritization data and in advance of detecting the sunder event, a set of tiebreaker ownership indicators may be established. The set of cluster profile data for the cluster of disperse nodes may include a set of computing capabilities, a set of logical relationships, a set of physical locations, and a set of roles. A sunder event which indicates a partitioned status may be detected with respect to the cluster of disperse nodes. In response to detecting the sunder event, the set of sunder event response prioritization data may be redetermined. In response to redetermining the set of sunder event response prioritization data, the set of tiebreaker ownership indicators may be reestablished. The set of sunder event response prioritization data may be examined. A sunder event response operation may be identified using the set of tiebreaker ownership indicators. In response to detecting the sunder event, the sunder event response operation may be performed to maintain asset availability. In embodiments, the sunder event response operation may include selecting a winning portion of the cluster of disperse nodes, fencing a losing portion of the cluster of disperse nodes, or halting a losing portion of the cluster of disperse nodes. In embodiments, the sunder event response operation may include swapping an asset configuration from a losing portion of the cluster of disperse nodes to a winning portion of the cluster of disperse nodes with respect to an asset operating on the cluster of disperse nodes.

In embodiments, a change in a placement arrangement may be sensed with respect to the cluster of disperse nodes. In response to sensing the change in the placement arrangement, the set of sunder event response prioritization data may be redetermined. In response to redetermining the set of sunder event response prioritization data, the set of tiebreaker ownership indicators may be reestablished. In embodiments, a foremost priority indicator of the set of tiebreaker ownership indicators may be acquired by a single node of the cluster of disperse nodes. In embodiments, a plurality of nodes of the cluster of disperse nodes may have access to the set of tiebreaker ownership indicators.

In embodiments, the role of a winning portion may be switched from a lower-level role to a higher-level role. In embodiments, a set of connections with an asset may be switched from a first linkage with the losing portion to a second linkage with the winning portion. In embodiments, an allocation of the asset may be switched from the losing portion to the winning portion. In embodiments, a role of the asset may be switched from the losing portion to the winning portion. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
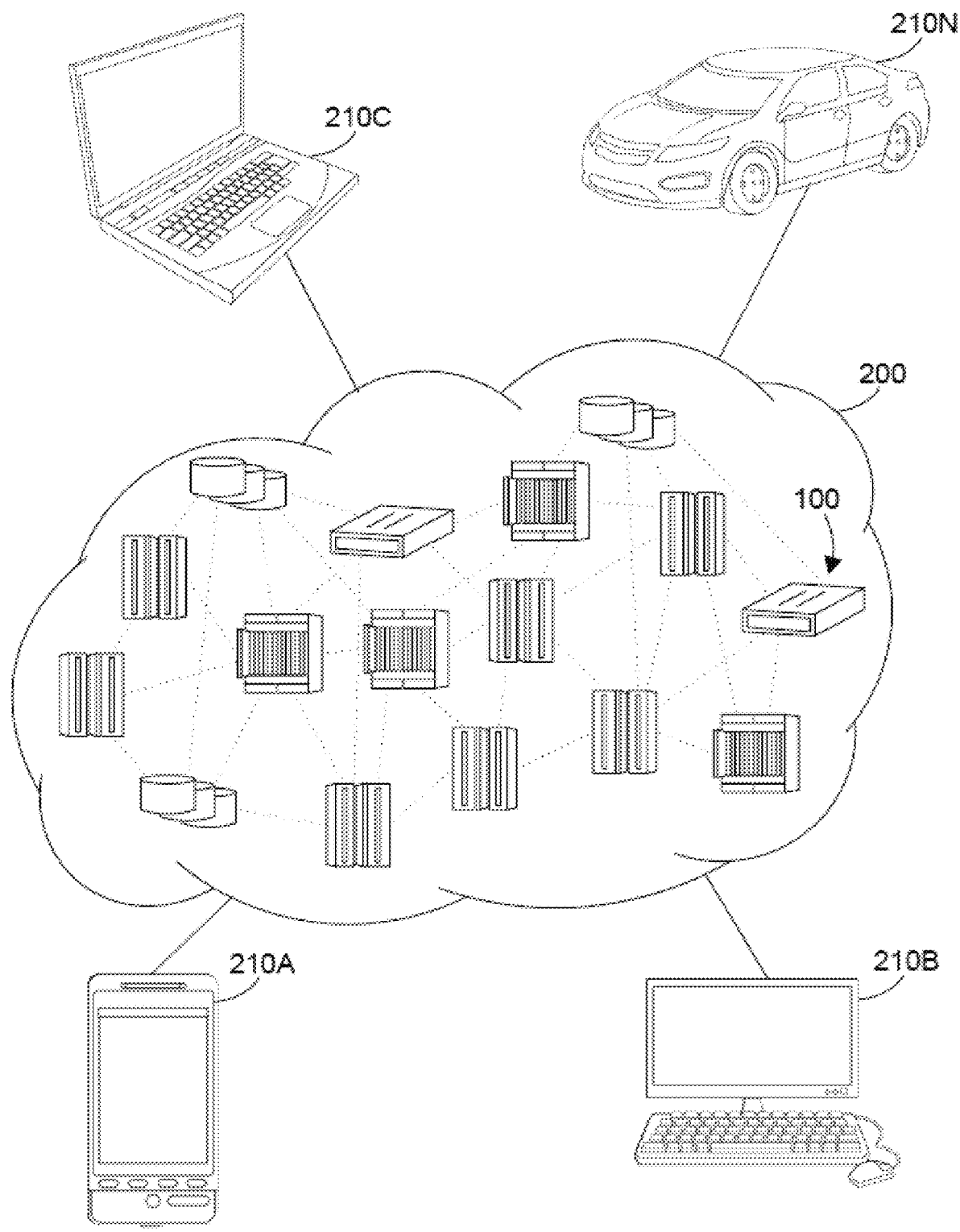
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
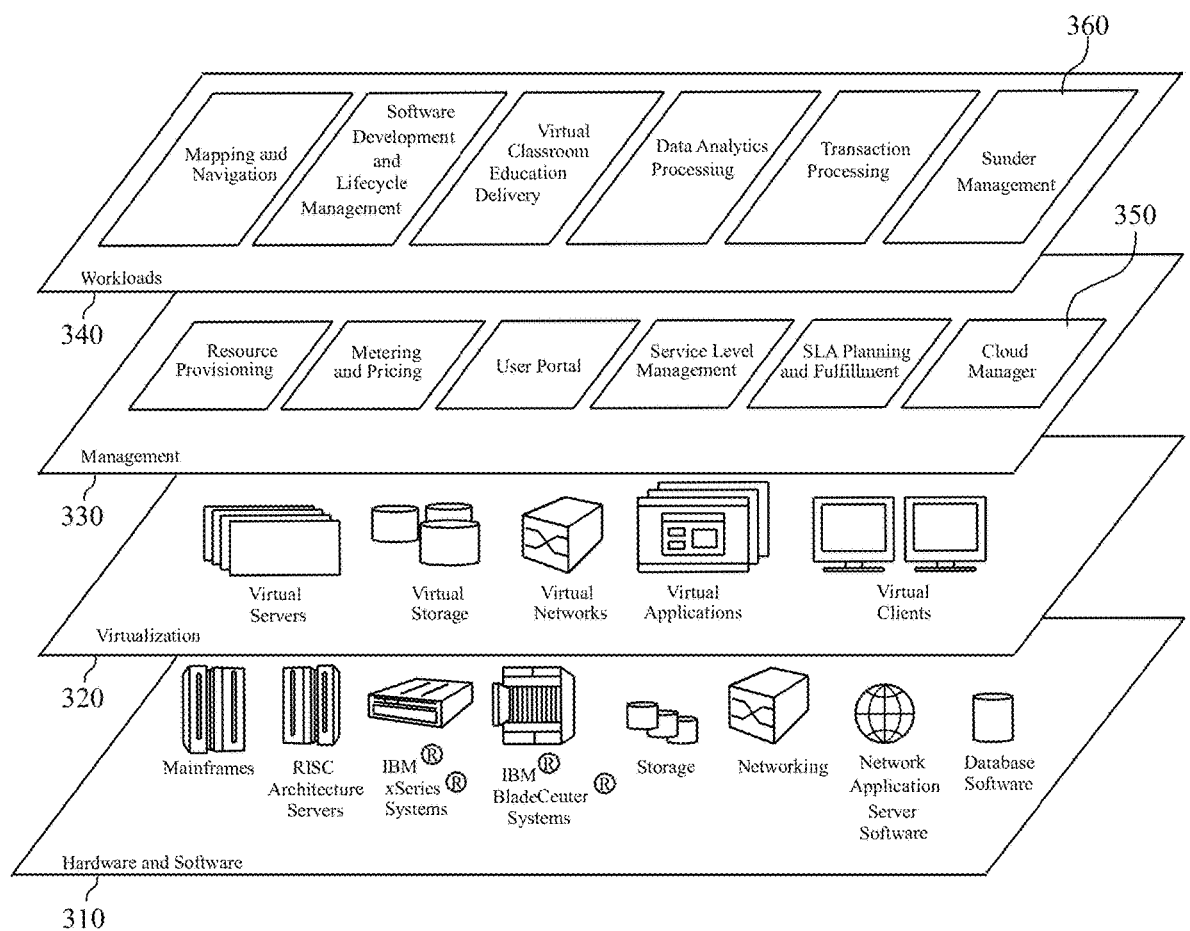
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and sunder management 360, which may be utilized as discussed in more detail below.

Figure 4:
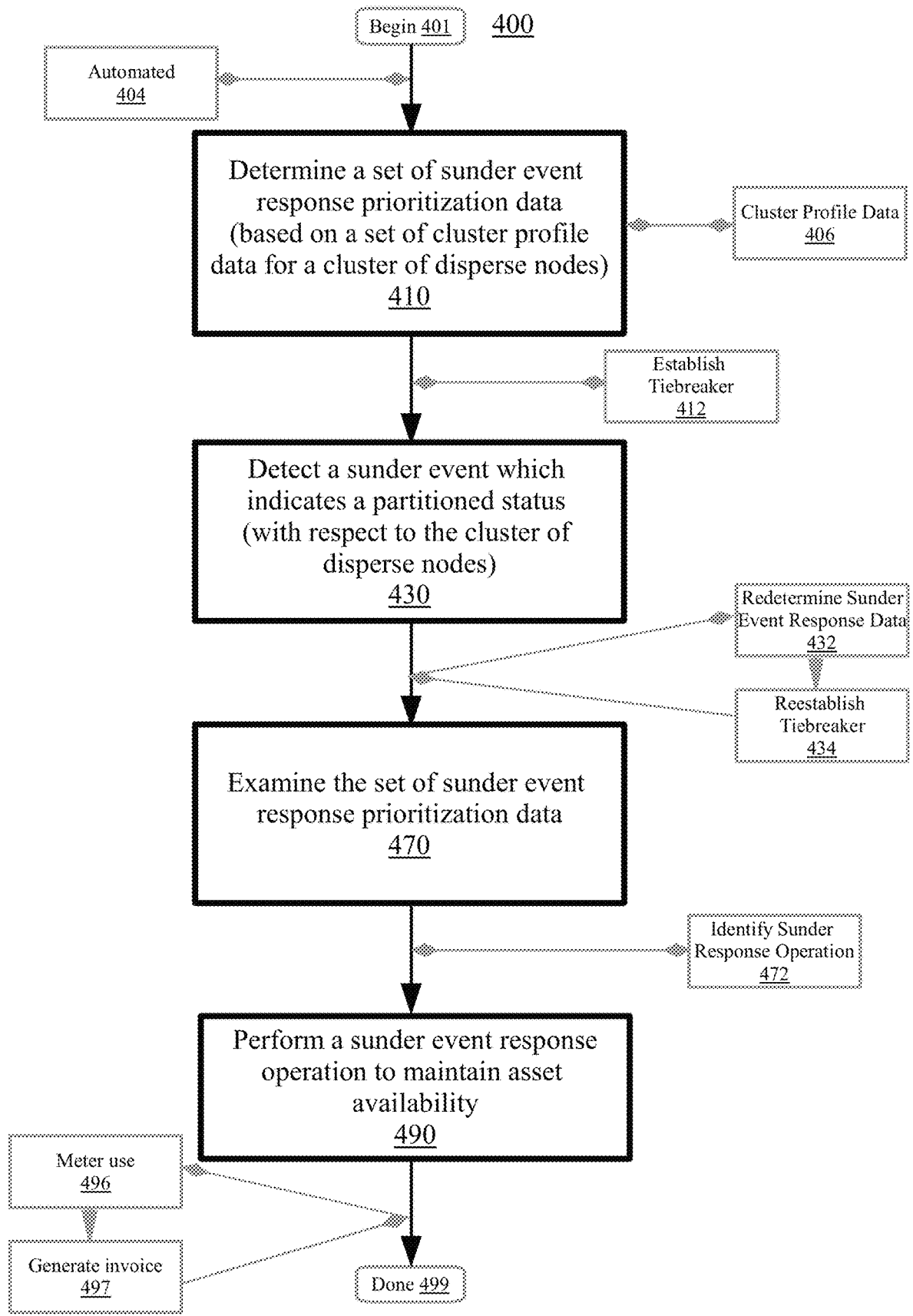
FIG. 4 is a flowchart illustrating a method for sunder management with respect to a shared pool of configurable computing resources having a cluster of disperse nodes, according to embodiments.

FIG. 4 is a flowchart illustrating a method 400 for sunder management with respect to a shared pool of configurable computing resources having a cluster of disperse nodes. Aspects of FIG. 4 relate to using a set of sunder event response prioritization data to perform a sunder event response operation with respect to a cluster of disperse nodes. In this way, asset and service availability of the cluster of disperse nodes may be maintained in the event of a sunder, merge, cluster partition, or other change to the physical or logical topography of the compute node cluster. The cluster of disperse nodes may include a group of distributed computing devices communicatively connected over a network. The nodes in the cluster may belong to one of a number of different physical or logical regions, locations, or subgroups. Leveraging sunder management techniques may be associated with performance, efficiency, and service availability for a disperse computing cluster. The method 400 may begin at block 401.

In embodiments, the determining, the detecting, the examining, the performing, and other steps described herein may each occur in an automated fashion without user intervention at block 404. In embodiments, the determining, the detecting, the examining, the performing, and other steps described herein may be carried out by an internal sunder management module maintained in a persistent storage device of a computing node located within a cluster of disperse nodes. In certain embodiments, the determining, the detecting, the examining, the performing, and other steps described herein may be carried out by an external sunder management module hosted by a remote computing device or server (e.g., accessible via a subscription, usage-based, or other service model). In this way, aspects of sunder management may be performed using automated computing machinery without manual action. Other methods of performing the steps described herein are also possible.

At block 410, a set of sunder event response prioritization data may be determined. The set of sunder event response prioritization data may be determined based on a set of cluster profile data for the cluster of disperse nodes. Generally, determining can include identifying, computing, formulating, or otherwise ascertaining the set of sunder event response prioritization data. In embodiments, the sunder event response prioritization data may include information and statistics that define a hierarchy of compute nodes and compute node groups. The sunder event response prioritization data may specify a set of weights or priority values that delineate the relative importance of a particular compute node or group of compute nodes relative to other members of the disperse node cluster. In embodiments, the sunder event response prioritization data may be used to ascertain the owner of a tiebreaker during a sunder event, merge, cluster partition, tiebreaker contention, or other network topology change. For instance, the sunder event response prioritization data may designate that a compute node A2 of a second region may be prioritized for tiebreaker ownership more highly than a compute node C3 of a third region. In embodiments, determining may include evaluating a set of cluster profile data for the disperse node cluster, and formulating the sunder event response prioritization data based on the system properties (e.g., computing resource availabilities, host application performance), physical and logical groupings, and other characteristics of the disperse node cluster. In embodiments, the set of cluster profile data may be determined based on the instructions of a user or network administrator. Other methods of determining the set of sunder event response prioritization data are also possible.

In embodiments, the set of cluster profile data may include a set of computing capabilities, a set of logical relationships, a set of physical locations, or a set of roles at block 406. As described herein, the set of cluster profile data may be used (e.g., evaluated, analyzed) to determine the set of sunder event response prioritization data. In embodiments, the set of computing capabilities may indicate the system properties, performance characteristics, and other hardware and software resources of the disperse node cluster. For example, the set of computing capabilities may include memory and processing resources, network bandwidth, security protocols, application hosting requirements, historical performance results, and the like. In embodiments, the set of logical relationships may indicate the logical topology of the disperse node cluster, including the arrangement of compute nodes and devices on the computer network and how they communicate with one another. For example, the logical relationships may describe which compute nodes are communicatively connected, the communication protocols and network ports/paths used for data transfer, and other features of the communication infrastructure of the cluster of disperse nodes. In embodiments, the set of physical locations may indicate the geographic position of the compute nodes of the cluster. For instance, the set of physical locations may provide a macroscopic indication of the real-world location of one or more compute nodes (e.g., country, city, housing facility), or a fine-grained description of the position of a compute node (e.g., room, aisle, rack). In embodiments, the set of physical locations may indicate the physical topology (e.g., how compute nodes of the cluster are connected through cables; physical network structure) of the cluster of disperse nodes. In embodiments, the set of roles may indicate the type or function of one or more network nodes. For instance, the set of roles may include performance characteristics, workload assignments, and hierarchical positions (e.g., primary, standby) of one or more compute nodes of the cluster. Other types of cluster profile data are also possible.

Consider the following example. As described herein, the set of sunder event response prioritization data may be determined based on the set of cluster profile data for the cluster of disperse nodes. In embodiments, determining the set of sunder event response prioritization data may include using a cluster diagnostic tool to evaluate the set of computing capabilities, set of logical relationships, set of physical locations, and set of roles of one or more compute nodes of the disperse cluster, and generate the set of sunder event response prioritization data based on the evaluation results of the cluster profile data. In embodiments, the cluster diagnostic tool may give more weight/priority to compute nodes that have more prominent roles (e.g., primary rather than standby, secondary, or backup), compute nodes that are more important within particular groups or subgroups (e.g., handle more data traffic, larger workloads), compute nodes that have more available system resources (e.g., storage space, processor, memory), or have compute nodes that have physical or logical topologies conducive to certain types of applications (e.g., physical proximity to reduce latency, communication connections that facilitate data transfer). Based on the evaluation of the set of cluster profile data, priority values may be assigned to compute nodes of the cluster based on their characteristics and evaluation results. Other methods of determining the set of sunder event prioritization response data are also possible.

In embodiments, a set of tiebreaker ownership indicators may be established at block 412. The set of tiebreaker ownership indicators may be established in response to determining the set of sunder event prioritization data and in advance of detecting the sunder event. Generally, establishing can include creating, instantiating, generating, or assigning the set of tiebreaker ownership indicators. Aspects of the disclosure relate to the recognition that, in the case of a sunder, merge, cluster partition, or other network topology change event, determining a group or subgroup of compute nodes to assume and maintain the network management tasks of the disperse node cluster (e.g., a "winning" side/group) may be associated with service availability and application persistence (e.g., maintaining tiebreaker ownership by a preferred node). Accordingly, aspects of the disclosure relate to utilizing a set of tiebreaker ownership indicators to designate (e.g., predetermine) one or more compute nodes or subsets of compute nodes as the winner of a sunder event to maintain service availability and continuity (e.g., and prevent the winner from being decided arbitrarily). In embodiments, the set of tiebreaker ownership indicators may include markers, flags, tags, or other identifiers that identify a compute node or group of nodes as the predetermined winner in the event of a sunder, merge, cluster partition, or other network topology change event. Establishing may include coupling the set of tiebreaker ownership indicators with a database entry for one or more compute nodes in a centrally maintained network topology database. In embodiments, establishing the set of tiebreaker ownership indicators may include using the set of sunder event prioritization data to identify those compute nodes or groups of compute nodes that have the highest weight/priority, and assigning the set of tiebreaker ownership indicators to those compute nodes. Other methods of establishing the set of tiebreaker ownership indicators are also possible.

At block 430, a sunder event may be detected with respect to the cluster of disperse nodes. The sunder event may indicate a partitioned status. Generally, detecting can include sensing, discovering, recognizing, identifying, or otherwise ascertaining the sunder event with respect to the cluster of disperse nodes. As described herein, the sunder event may include a split or division of one or more compute node groups in the cluster of disperse nodes, a merge (e.g., combination, join, consolidation) of one or more compute node groups, or other change to the physical or logical topology of the cluster of disperse nodes (e.g., change to the membership of one or more cluster regions, locations, or subgroups). In embodiments, detecting the sunder event may include utilizing a network diagnostic tool to monitor the topology of the cluster of disperse nodes, and ascertain that node membership in the cluster has changed. As an example, in certain embodiments, a cluster of disperse nodes distributed throughout three physical locations A, B, and C may undergo a sunder event in which the compute nodes stationed at location B are separated from the cluster. For instance, the sunder event may include an error event that interrupts data traffic and other communication between the compute nodes at location B and those at locations A and C. In embodiments, in response to detecting the sunder event, a partition status indicating the nature of the sunder event (e.g., which nodes separated from the cluster, their roles/performance attributes, workloads) may be registered in a network topology database. Other methods of detecting the sunder event with respect to the cluster of disperse nodes are also possible.

In embodiments, the set of sunder event response prioritization data may be redetermined at block 432. The set of sunder event response prioritization data may be redetermined in response to detecting the sunder event. Generally, redetermining can include identifying, revising, computing, editing, formulating, or otherwise ascertaining the set of sunder event response prioritization data in response to detecting the sunder event. Aspects of the disclosure relate to the recognition that the occurrence of a sunder event may impact or influence the priority associated with one or more compute nodes of the disperse node cluster. Accordingly, in embodiments, the set of sunder event response prioritization data may be redetermined or revised to reflect the updated compute node hierarchy of the disperse node cluster in response to a sunder event. In embodiments, redetermining the set of sunder event response prioritization data may include collecting and re-evaluating a set of cluster profile data indicating information regarding the computing capabilities, logical relationships, physical locations, and roles of the compute nodes in the disperse node cluster. Based on the evaluation of the set of cluster profile data, the priorities assigned to one or more compute nodes of the cluster may be re-formulated. Other methods of redetermining the set of sunder event response prioritization data are also possible.

In embodiments, the set of tiebreaker ownership indicators may be reestablished at block 434. The set of tiebreaker ownership indicators may be reestablished in response to redetermining the set of sunder event response prioritization data. Generally, reestablishing can include creating, altering, generating, revising or assigning the set of tiebreaker ownership indicators. Aspects of the disclosure relate to the recognition that modifications or revisions to the set of sunder event response prioritization data may influence which compute node or group of compute nodes may be associated with the set of tiebreaker ownership indicators. Accordingly, in embodiments, the set of tiebreaker ownership indicators may be reevaluated and assigned to a subset of compute nodes to designate a new winner of a sunder event based on an updated (e.g., redetermined) set of sunder event response prioritization data (e.g., automatically relocating the set of tiebreaker ownership indicators to maintain advantage for a preferred node group to retain service in case of a sunder event). Reestablishing the set of tiebreaker ownership indicators may include modifying a set of data base entries for one or more compute nodes in a network topology database to couple the set of tiebreaker ownership indicators with a different set of compute nodes of cluster of disperse nodes. For instance, reestablishing may include switching the set of tiebreaker ownership indicators from a first subset of compute nodes to a second subset of compute nodes in response to identifying that the second subset has a higher priority as indicated by the set of sunder event response prioritization data. Other methods of reestablishing the set of tiebreaker ownership indicators is also possible.

Consider the following example. A disperse cluster of nodes may include a first region, a second region, and a third region. A set of sunder event response prioritization data (e.g., based on cluster profile data for the compute nodes of the cluster) may assign a priority to each compute node of the cluster. In embodiments, one or more nodes of the second region of the cluster may be associated with the highest priority values of the compute nodes in the cluster. Accordingly, a set of tiebreaker ownership indicators may be established for the second region such that in the event of a sunder, the second region is elected as the winner of the sunder event, and will assume network management duties for the disperse cluster. In embodiments, a sunder event may occur, and communication between the first region and the other two regions may be severed. As such, the second region may be determined as the winner of the sunder event (e.g., as it is associated with the set of tiebreaker ownership indicators), and manage the assets (e.g., workloads, virtual machines, applications) of the cluster to facilitate service ability. Subsequent to the sunder event, the set of sunder event response prioritization data for the cluster may be redetermined (e.g., cluster profile data for the post-sunder network may be evaluated by a cluster diagnostic tool), and the compute nodes of the third region may be assigned the highest priority values of the cluster (e.g., due to shifts in the available system resources, network connections, and other network topology changes). Accordingly, the updated sunder event response prioritization data for the cluster may be used to move the set of tiebreaker ownership indicators from the second region of the cluster to the third region. Other methods of managing the set of sunder event response data and set of tiebreaker ownership indicators are also possible.

At block 470, the set of sunder event response prioritization data may be examined. Generally, examining can include analyzing, investigating, evaluating, or otherwise assessing the set of sunder event response prioritization data. Aspects of the disclosure relate to utilizing the set of sunder event response prioritization data to facilitate sunder event response management. In embodiments, examining may include using the set of sunder event response prioritization data to identify which compute node or set of compute nodes is associated with the set of tiebreaker ownership indicators. For instance, examining may include parsing a set of database entries that maintain the set of sunder event response prioritization data, and ascertaining one or more compute nodes that are associated with a priority or weighting level above a threshold (e.g., priority rating of 2 or above). Using the priority levels for each compute node of the cluster, the compute node or nodes that are associated with the set of tiebreaker ownership indicators may be identified. In embodiments, examining may include analyzing the set of sunder event response prioritization data in addition to the physical and logical topology of the network to determine candidate prioritization configurations for different sunder and merge situations. As an example, examining may include predicting potential changes to the priority level of certain compute nodes depending on how cluster memberships changes (e.g., whether more compute nodes are added to one or more regions of a cluster, compute nodes are lost/removed from a cluster). Other methods of examining the set of sunder event response prioritization data are also possible.

In embodiments, a sunder event response operation may be identified at block 472. The sunder event response operation may be identified using the set of tiebreaker ownership indicators. Generally, identifying can include recognizing, ascertaining, selecting, or otherwise determining the sunder event response operation. The sunder event response operation may include a process, procedure, or other action for handling (e.g., managing, controlling, resolving) the sunder event. As examples, the sunder event response operation may include adding or removing nodes from the cluster or node subgroups within the cluster, rerouting network traffic, migrating virtual machines from one compute node to another, transferring applications or other workloads, or the like. In embodiments, identifying the sunder event response operation may include analyzing the sunder event, and using data regarding the nature (e.g., cause, impact to the cluster) of the sunder event to ascertain a sunder event response operation associated with positive impacts with respect to the cluster of disperse nodes (e.g., service availability, application performance). In certain embodiments, identifying the sunder event response operation may include referencing an archive of historical data regarding sunder events and corresponding sunder event response operations, and selecting a sunder event response operation that has been used to manage sunder events in the past. Other methods of identifying the sunder event response operation are also possible.

At block 490, the sunder event response operation may be performed. The sunder event response operation may be performed in response to detecting the sunder event to maintain asset availability. As described herein, aspects of the disclosure relate to the recognition that a sunder, merge, or other network topology change may impact the availability of assets (e.g., workloads, virtual machines, applications) running on the cluster of disperse nodes. Accordingly, as described herein, aspects of the disclosure relate to performing a sunder event response operation to manage a sunder event, and facilitate continuous asset availability. Generally, performing can include executing, instantiating, carrying out, or otherwise implementing the sunder event response operation. In embodiments, performing may include modifying the physical or logical topology of the disperse node cluster to facilitate availability of assets on the cluster. As examples, performing the sunder event response operation may include identifying a winning portion of the cluster (e.g., to assume network management duties), fencing a portion of the cluster (e.g., isolating damaged/malfunctioning nodes), halting a portion of the cluster (e.g., removing/suspending nodes from operation), or changing the membership of the cluster by adding or removing nodes from particular regions or compute node subgroups. Other methods of performing the sunder event response operation are also possible.

Consider the following example. A cluster of disperse nodes may include a first region having a Compute Node A and a Compute Node B, a second region having a Compute Node C, Compute Node D, and Compute Node E, and a third region having a Compute Node F and a Compute Node G. Cluster profile data for the cluster of disperse nodes may be evaluated, and a set of sunder event response prioritization data may be determined that assigns a priority to each compute node of the cluster based on the computing capabilities, logical relationships, physical locations, and roles of each compute node, respectively. For instance, Compute Nodes A, C, D and G may be assigned priority values of 3, Compute Node B may be assigned a priority value of 1, and Compute Nodes E and F may be assigned priority values of 2 (e.g., where lesser priority values indicate higher weighting/priority, and greater priority values indicate lower weighting/priority). As described herein, a set of tiebreaker ownership indicators may be established in relation to the first region (e.g., as the sunder event response prioritization data indicates that Compute Node B of the first region has the highest priority value of the nodes in the cluster). In embodiments, a sunder event may occur with respect to the cluster of disperse nodes, and Compute Node F of the third region may become inaccessible to the first and second regions. The sunder event may be detected (e.g., by a network diagnostic tool), and the set of sunder event response prioritization data for the cluster may be examined to determine that the first region is associated with the set of tiebreaker ownership indicators. As described herein, a sunder event response operation may be performed to manage the sunder event and maintain asset availability. For instance, workloads and applications previously managed by Compute Node F may be migrated to the first region, and Compute Node G may be isolated or fenced off until the third region can be repaired. Other methods of managing the sunder event with respect to the cluster of disperse nodes are also possible.

In embodiments, use of sunder event management techniques may be metered at block 496. Metering can include measuring, tracking, documenting, recording, or calculating the degree or extent of the utilization of the sunder event management techniques. The degree of utilization may be calculated based on the number of times sunder event response operations were performed (e.g., 10 times, 100 times), the amount of data managed using sunder event management techniques (e.g., applications or assets transferred, migrated, isolated), application configurations (e.g., computer configurations, sunder event management parameters), resource usage (e.g., data processed by the cluster of disperse nodes) or other means. Based on the metered use, an invoice may be generated at block 497. The invoice may include a bill, fee, service charge, or other itemized breakdown specifying compensation for the usage of sunder event management. Subscription based models are also possible.

Method 400 concludes at block 499. Aspects of method 400 may provide performance or efficiency benefits for sunder event management. For example, aspects of method 400 may have positive impacts with respect to managing sunder events with respect to a cluster of disperse compute nodes. As described herein, the determining, the detecting, the examining, the performing, and other steps described herein may each occur in an automated fashion without user intervention. Altogether, leveraging sunder management techniques with respect to a cluster of disperse nodes may be associated with tiebreaker persistence and cluster asset availability.

Figure 5:
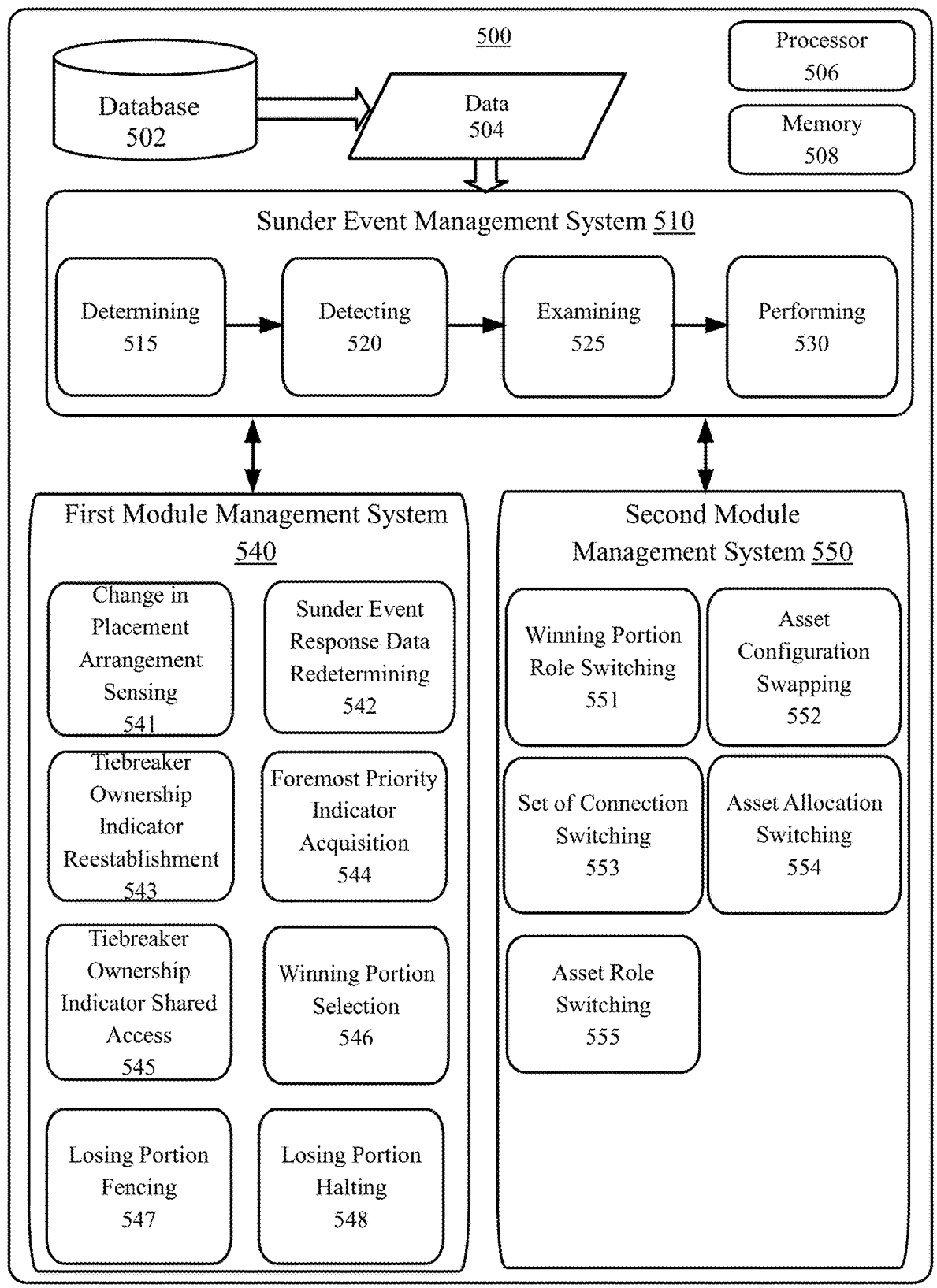
FIG. 5 shows an example system for sunder event management with respect to a shared pool of configurable computing resources having a cluster of disperse nodes, according to embodiments.

FIG. 5 shows an example system 500 for sunder event management with respect to a shared pool of configurable computing resources having a cluster of disperse nodes, according to embodiments. Aspects of FIG. 5 relate to facilitating performance of a sunder event response operation to maintain asset availability for the cluster of disperse nodes. In embodiments, identifying and performing the sunder event response operation may be based on a set of sunder event response prioritization data and a set of tiebreaker ownership indicators for the cluster of disperse nodes. The example system 500 may include a processor 506 and a memory 508 to facilitate implementation of sunder event management techniques. The example system 500 include a database 502 (e.g., cluster topology database) configured to maintain data and information pertaining to cluster topology and cloud partition events. In embodiments, the example system 500 may include a sunder event management system 510. The sunder event management system 510 may be communicatively connected to the database 502, and be configured to receive data 504 (e.g., notification of a sunder event) related to cluster topology changes. The sunder event management system 510 may include a determining module 515 to determine a set of sunder event response prioritization data, a detecting module 520 to detect a sunder event with respect to the cluster of disperse nodes, an examining module 525 to examine the set of sunder event response prioritization data, and a performing module 530 to perform the sunder event response operation to maintain asset availability. In embodiments, the determining, detecting, and examining may each be performed in a dynamic fashion (e.g., ongoing, in real-time, on-the-fly) by the sunder event management system 510 to streamline sunder management (e.g., maintain service availability). The sunder event management system 510 may be communicatively connected with a first module management system 540 and a second module management system 550 that each include one or more modules for implementing aspects of sunder event management.

In embodiments, a change in a placement arrangement with respect to the cluster of disperse nodes may be sensed at module 541. Generally, sensing can include recognizing, detecting, discovering, ascertaining, or otherwise identifying the change in the placement arrangement. The placement arrangement may include a distribution, structure, or allocation of assets among the cluster of disperse nodes. The placement arrangement may include the distribution of compute nodes among different physical locations, the deployment of virtual machines or applications on different compute nodes, or other assets of the cluster. In embodiments, sensing a change in the placement arrangement may include detecting that compute nodes have been added or removed from the cluster, virtual machines or applications have migrated from one compute node to another, or that the physical or logical topology of the cluster has been otherwise configured. Other methods of sensing the change in the placement arrangement are also possible.

In embodiments, the set of sunder event response prioritization data may be redetermined at module 542. The set of sunder event response prioritization data may be redetermined in response to sensing the change in the placement arrangement. Generally, redetermining can include identifying, revising, computing, editing, formulating, or otherwise ascertaining the set of sunder event response prioritization data in response to sensing the change in the placement arrangement. Aspects of the disclosure relate to the recognition that a change or modification to the network topology of the cluster of disperse nodes may affect the priority or weighting assigned to one or more compute nodes. Accordingly, in embodiments, the set of sunder event response prioritization data may be redetermined or revised to reflect the updated compute node hierarchy of the disperse node cluster in response a change to the placement arrangement of the cluster. As an example, in response to detecting that a first compute node has received an allocation of a new high-volume workload and has limited available system resources, the sunder event response prioritization data may be revised to lower the priority level associated with the first compute node (e.g., less available system resources to handle relocated assets in the event of a sunder). Other methods of redetermining the set of sunder event response prioritization data are also possible.

In embodiments, the set of tiebreaker ownership indicators may be reestablished at module 543. The set of tiebreaker ownership indicators may be reestablished in response to redetermining the set of sunder event response prioritization data. Generally, reestablishing can include creating, altering, generating, revising or assigning the set of tiebreaker ownership indicators. Aspects of the disclosure relate to the recognition that modifications or revisions to the set of sunder event response prioritization data may influence which compute node or group of compute nodes may be associated with the set of tiebreaker ownership indicators. Accordingly, in embodiments, the set of tiebreaker ownership indicators may be reevaluated and assigned to a subset of compute nodes to designate a new winner of a sunder event based on an updated (e.g., redetermined) set of sunder event response prioritization data. Reestablishing the set of tiebreaker ownership indicators may include shifting the set of tiebreaker ownership indicators from a first subset of compute nodes to a second subset of compute nodes. As an example, in response to the priority level of a first subset of compute nodes increasing above a threshold value (e.g., in response to additional compute nodes being added to the subset), the set of tiebreaker ownership indicators may be shifted to the first subset. Other methods of reestablishing the set of tiebreaker ownership indicators is also possible.

In embodiments, a foremost priority indicator of the set of tiebreaker ownership indicators may be acquired at module 544. Generally, acquiring can include obtaining, receiving, attaining, or collecting the foremost priority indicator of the set of tiebreaker ownership indicators. The foremost priority indicator may include a tag, flag, or other identifier that marks a particular node or set of nodes as having the highest priority or weighting level of the cluster of disperse nodes. In embodiments, assigning the foremost priority indicator may include evaluating the priority level of the compute nodes included in the cluster of disperse nodes, and assigning the foremost priority indicator to a node or set of nodes having a priority level that achieves a threshold priority value (e.g., the highest priority level). As an example, in a cluster of compute nodes having a first node with a priority value of 3, a second node with a priority value of 4, a third node with a priority value of 1, and a fourth node with a priority value of 2, the third node may acquire the foremost priority indicator (e.g., where lower integer values represent higher priority within the cluster). Other methods of acquiring the set of tiebreaker ownership indicators are also possible.

In embodiments, a plurality of nodes of the cluster of disperse nodes may have access to the set of tiebreaker ownership indicators at module 545. In embodiments, the set of tiebreaker ownership indicators may be stored in a central network topology database to which a plurality of compute nodes in the cluster have access. The compute nodes with access permission to the central network topology database may perform periodic (e.g., after an elapsed temporal period) or triggering-event based (e.g., after a network topology modification, change to a placement arrangement) checks of the central network topology database to verify the set of tiebreaker ownership indicators. In embodiments, a plurality of nodes of the cluster of disperse nodes may maintain individual copies of the set of tiebreaker ownership indicators. For instance, each node with access to the set of tiebreaker ownership indicators may locally (e.g., in onboard, internal memory/storage) maintain a tiebreaker ownership table to store the set of tiebreaker ownership indicators. In certain embodiments, the set of tiebreaker ownership indicators may be periodically synchronized (e.g., with the tiebreaker ownership indicators on other compute nodes, in a central network topology database) to reflect up-to-date network hierarchy and tiebreaker ownership status. Other methods of accessing the set of tiebreaker ownership indicators are also possible.

In embodiments, the sunder event response operation may include selecting a winning portion of the cluster of disperse nodes at module 546. Generally, selecting can include choosing, specifying, electing, designating, or identifying the winning portion of the cluster of disperse nodes. As described herein, aspects of the disclosure relate to identifying a group or subgroup of compute nodes to assume and maintain the network management tasks of the disperse node cluster (e.g., a "winning," "prevailing," or "surviving" side) in the event of a sunder event. In embodiments, selecting the winning portion of the cluster of disperse nodes may include designating the node or subset of nodes associated with the set of tiebreaker ownership indicators as the winning portion of the sunder event. Aspects of the disclosure relate to the recognition that, in certain embodiments, multiple compute nodes or groups of compute nodes may have equivalent priorities. In such a situation, a set of deterministic criteria may be used to designate the compute node to be associated with the set of tiebreaker indicators and determine the winning portion of the cluster. The set of deterministic criteria may include requirements, stipulations, or other factors used to determine ownership of the tiebreaker indicators (e.g., in situations where multiple nodes have equivalent priority values). For instance, the set of deterministic criteria may specify that compute nodes associated with a primary (e.g., active) location or role be preferred over compute nodes in a standby location or role. In response to selecting the winning portion of the cluster, the winning portion of compute nodes may initiate rearrangement of system resources, network bandwidth, application workloads, virtual machines, and other assets to maintain service availability. Other methods of selecting the winning portion of the cluster are also possible.

In embodiments, the sunder event response operation may include fencing a losing portion of the cluster of disperse nodes at module 547. Generally, fencing can include enclosing, separating, quarantining, or isolating the losing portion of the cluster of disperse nodes. The losing portion of the cluster may include one or more compute nodes that were not associated with the set of tiebreaker ownership indicators at the time of a sunder event, and are subject to resource or asset management actions by the winning portion of compute nodes. Aspects of the disclosure relate to the recognition that, in the event of a sunder event, one or more nodes of the losing portion may be in control of shared resources or data that may be desirable to be transferred or migrated to other nodes (e.g., in the winning portion of the cluster). Accordingly, fencing may include limiting I/O communication (e.g., constructing a virtual fence) with respect to one or more nodes of the losing portion to separate the compute nodes of the losing portion from the winning portion. In embodiments, data or assets located on the losing portion may be transferred or migrated to other compute nodes prior to fencing the losing portion (e.g., to maintain data integrity). Fencing may include using a shared disk file system to disallow access to data stored on the losing portion of compute nodes and protect active networking processes. Other methods of fencing the losing portion of the cluster of disperse nodes are also possible.

In embodiments, the sunder event response operation may include halting a losing portion of the cluster of disperse nodes at module 548. Generally, halting can include pausing, stopping, interrupting, freezing, or removing the losing portion of the cluster of disperse nodes. Aspects of the disclosure relate to the recognition that, in the event of a sunder event, one or more nodes of the losing portion of the cluster may be associated with erratic behavior or be unable to maintain service availability (e.g., as the result of errors, network malfunctions). Accordingly, aspects of the disclosure relate to pausing or removing from operation one or more compute nodes of the losing portion of the cluster to protect data integrity of the cluster. In embodiments, halting may include disabling or powering off (e.g., STONITH method) one or more nodes of the losing portion. In certain embodiments, halting may include power fencing or resource fencing techniques to limit the power or system resources allocated to a particular set of compute nodes of the losing portion of the cluster. Other methods of halting the losing portion of the cluster of disperse nodes are also possible.

In embodiments, a role of a winning portion may be switched from a lower-level role to a higher-level role at module 551. Generally, switching can include modifying, adjusting, promoting, or changing the role of a winning portion of the cluster of disperse nodes. Aspects of the disclosure relate to the recognition that, in the event of a sunder, merge, or other network topology change, it may be desirable to change the role of one or more nodes in the winning portion of the cluster to facilitate management of assets and cluster resources (e.g., rearranged as a result of the sunder). As such, in embodiments, one or more compute nodes of the winning portion may be promoted from a lower-level role to a higher-level role within the cluster (e.g., to assume additional resource/asset management duties). In embodiments, switching a role of a lower-level compute node to a higher-level compute node may include reclassifying a compute node to a higher hierarchical position within the cluster, and assigning additional network management tasks, workloads, or assets to the compute node. As an example, consider that a sunder event results in multiple compute nodes in the losing portion of the cluster being isolated, such that the workloads, applications, and assets previously managed by the isolated nodes need to be allocated to other compute nodes within the cluster. Accordingly, in such a situation, one or more compute nodes of the winning portion may be switched from a "standby" role to a "primary" role, and assume management of the assets relocated from the isolated nodes. Other methods of switching the role of compute nodes (e.g., higher-level roles to lower level-roles) are also possible.

In embodiments, an asset configuration from a losing portion of the cluster of disperse nodes may be swapped to a winning portion of the cluster of disperse nodes at module 552. The asset configuration may be swapped with respect to an asset operating on the cluster of disperse nodes. The asset configuration may include the organization, composition, or arrangement of system parameters, resource allocations, input/output protocols, communication channels, workload deployments, and other attributes that define the operational profile of an asset (e.g., virtual machine, application). Generally, swapping can include transferring, relocating, shifting, or moving the asset configuration. In embodiments, swapping the asset configuration may include configuring one or more compute nodes in the winning portion of the cluster to receive deployment and perform operation of an asset from the losing portion of the cluster. Other methods of swapping the asset configuration are also possible.

In embodiments, swapping the asset configuration may include switching a set of connections with the asset from a first linkage with the losing portion to a second linkage with the winning portion at module 553. The first and second linkages may include physical cabling connections, data communication channels, input/output protocols, network ports or other methods of data communication. Generally, switching may include routing, exchanging, transmitting, directing, or modifying the set of connections from the first linkage with the losing portion to the second linkage with the winning portion. Aspects of the disclosure relate to the recognition that, in the event of a sunder event, switching communication connections from one set of compute nodes to another (e.g., from a losing portion to a winning portion) may facilitate asset configuration transfer and service availability. In embodiments, switching may include rerouting the flow of network traffic from the first linkage with the losing portion to the second linkage with the winning portion by changing a set of network addresses that specify the destination of the network traffic. As an example, consider a situation in which a sunder event has resulted in the migration of a virtual machine from a first compute node in the losing portion to a second compute node in the winning portion of the cluster. Accordingly, destination network addresses for the data traffic previously sent to the first compute node may be rerouted to second compute node. Other methods of switching the set of connections from a first linkage with the losing portion to a second linkage with the winning portion are also possible.

In embodiments, an allocation of the asset may be switched from the losing portion to the winning portion at module 554. Generally, switching can include assigning, placing, migrating, relocating, moving, or deploying an allocation of the asset from the losing portion to the winning portion. Aspects of the disclosure relate to the recognition that, in the event of a sunder, merge, cluster partition, or other network topology change, relocation of a workload, application, virtual machine, or other asset from the losing portion of the cluster to the winning portion of the cluster may maintain service availability. In embodiments, switching the allocation of the asset may include configuring system resources, input/output communication ports, and network connections to facilitate transfer and operation of the asset on the new host. In embodiments, switching the allocation of the asset may include shifting saved data and archived information for the asset from local storage on the original host compute node to the new host. As an example, in response to a sundering event with respect to a cluster of compute nodes, one or more nodes may be fenced or halted, limiting the operability of hosted assets. As such, one or more assets from the fenced or halted nodes may be migrated to compute nodes of the winning portion to maintain workload integrity. Other methods of switching the allocation of the asset are also possible.

In embodiments, a role of the asset may be switched from the losing portion to the winning portion at module 555. Generally, switching can include adjusting, modifying, altering, revising, or otherwise changing the role of an asset. The role of an asset may include the function, type, operative mode, or configuration of an asset (e.g., virtual machine, application). In embodiments, switching may include evaluating the nature of the asset (e.g., function, system performance characteristics) and reconfiguring the function or type of the asset based on the characteristics of the cluster environment (e.g., after a sunder event). For example, switching the role of an asset may include changing an asset from a "primary" (e.g., active) status to a "backup" (e.g., standby) status or the like. Consider, for instance, a situation in which an asset that was migrated from a losing portion of the cluster to a winning portion of the cluster in response to a sunder event is determined to be of high priority in maintaining service availability. As such, the asset may be switched from a "backup" status to a "primary" status to leverage the capabilities of the asset. Other methods of switching the role of an asset are also possible.

FIG. 6 shows a set of example cluster topologies 600 for sunder event management, according to embodiments. Aspects of the set of example cluster topologies 600 relate to a disperse cluster of nodes 610 and a hierarchical grouping 650. As described herein, aspects of the disclosure relate to performing a sunder event response operation with respect to a cluster of disperse nodes to maintain asset and service availability in the event of a sunder, merge, cluster partition, or other physical or logical topology change to the cluster of disperse nodes. In embodiments, the sunder event management techniques described herein may consider node properties when dynamically assigning, starting, and relocating resources and services within the node cluster. Sunder event management may consider computational attributes (e.g., available system resources) as well as role assignments (e.g., node function, type). As shown in FIG. 6, compute nodes may be dispersed in one of a number of regions (e.g., physical locations) as well as primary and secondary locations, with each group including a node hierarchy (e.g., priority for preferred and standby nodes).

In embodiments, the disperse cluster of nodes 610 may include a domain 615 having a Region X 620 and a Region Z 630. Both Region X 620 and Region Z 630 may include one or locations having a set of equivalent peer nodes residing in a common physical area. For instance, Region X 620 may have a Location A 622 and a Location B 624, and Region Z 630 may have a Location C 632 and a Location D 634. In embodiments, regions may represent a logical grouping of two independent locations (e.g., primary and standby locations). In embodiments, regions may also indicate a physical separation between the sets of locations joined by a network link 635. In the event of a sunder event (e.g., node failure), partitions between and within the depicted regions and locations may occur. When such sunders occur, each partition must decide whether it should survive (e.g., win) and continue cluster operations. As described herein, aspects of the cluster relate to using a set of tiebreaker ownership indicators to determine the winning (e.g., surviving) side of a cluster. The set of tiebreaker ownership indicators may be used to enforce the sunder decision and maintain cluster operations. In embodiments, the set of tiebreaker ownership indicators may be implemented using a small computer system interface persistent reservation (SCSIPR) disk.

In embodiments, the compute nodes depicted within the disperse cluster of nodes 610 may be grouped into a hierarchy based on characteristics including logical relationship, computational attributes, roles, and physical location. Groups and nodes within the disperse cluster of nodes 610 may be prioritized to indicate preference relative to their level in the hierarchy. The prioritization may be defined in the cluster configuration and known to a plurality of members of the cluster. In embodiments, sunder resolution may be performed in an automated fashion that favors the configured priority hierarchy. Application and resource states may be integrated with the priority to augment the sunder resolution. In embodiments, tiebreaker preemption may be utilized to safely shutdown (e.g., fence, halt) nodes, and acquire operational control to balance the cluster. The priority of nodes and regions within the disperse cluster of nodes 610 may be re-examined (e.g., redetermined, reestablished) following a sunder event to prepare the cluster for subsequent sunder events.

As described herein, the disperse cluster of nodes 610 may include a hierarchical grouping 650. The hierarchical grouping 650 may include a number of regions, locations, and partitions of compute nodes along with associated priorities. The hierarchical grouping 650 may include a domain 655 having a Region X 660 and a Region Z 670. Both Region X 660 and Region Z 670 may include one or locations having a set of peer nodes in physical and logical groupings joined through a network link 675. For instance, Region X 660 may have a Location A 662 and a Location B 664, and Region Z 670 may have a Location C 672 and a Location D 674. In embodiments, the locations of the hierarchical grouping 650 may be associated with role assignments within the disperse cluster of nodes 610. The role assignments of the locations may be used to indicate hierarchy (e.g., priority) within the disperse cluster of nodes 610. For instance, in embodiments, Location A 662 and Location C 672 may be designated to be "primary" locations, while Location B 664 and Location D 674 may be designated to be "standby" locations.

As described herein, the role assignments of the locations may be used to define a hierarchy of preferred nodes to continue cluster operations and maintain service availability in the event of a cluster partition. As an example, in embodiments, one or more locations associated with a "primary" role assignment may be designated as the owner of the set of tiebreaker ownership indicators. In embodiments, in the event that the network link 675 between Region X 660 and Region Z 670 breaks as part of a sunder event, the region associated with the set of tiebreaker ownership indicators may be configured to take protective action to allow the other side to continue operation. If the primary location of a region is down and the secondary location is joined with the primary location of a remote region, the node or group of nodes highest in the hierarchy of the surviving partition (e.g., associated with the set of tiebreaker ownership indicators) may be configured to maintain operations of the remote region. In the event of further sunders between locations of the operational region, the primary location may be selected as the winning side. Partitions between nodes of remaining locations may result in the nodes preferred by their role assignments to continue service. Other methods of structuring the hierarchical group 650 are also possible.

Aspects of the disclosure relate to the recognition that, in certain embodiments, it may be desirable to determine which compute node or nodes are associated with the set of tiebreaker ownership indicators based on the nature of the network topology change event. For instance, the compute node or nodes desirable to assume cluster management duties may differ depending on whether the network topology change event is a sunder event, merge event, cluster membership change, or other type of cluster partition. Accordingly, in embodiments, aspects of the disclosure relate to establishing a plurality of candidate tiebreaker indicators for multiple different compute nodes to facilitate versatility for sunder event management. Based on the nature of the topology change event, the compute node or nodes associated with positive impacts with respect to that particular type of topology change event may be selected as the winner, and assume cluster management duties. For instance, the plurality of candidate tiebreaker indicators may include a first candidate tiebreaker indicator associated with a first compute node, a second candidate tiebreaker indicator associated with a second compute node, and a third tiebreaker indicator associated with a third compute node of the disperse node cluster. Each candidate tiebreaker indicator may be coupled with a topology change response tag specifying a particular type of topology change event. For instance, the first candidate tiebreaker indicator may have a topology change response tag of "sunder," the second candidate tiebreaker indicator may have a topology change response tag of "merge" and the third candidate tiebreaker indicator may have a topology change response tag of "membership change." In the event of a topology change event, the compute node or nodes having the candidate tiebreaker indicator with a topology change response tag matching the type of topology change event may be selected to assume cluster management duties. For instance, in the event of a merge event, the second compute node may be selected as the winner (e.g., as it is associated with the second candidate tiebreaker indicator having the "merge" topology change response tag). Other methods of managing topology change events are also possible.

FIG. 7 shows an example priority mapping table 700 for a disperse cluster of nodes, according to embodiments. Aspects of FIG. 7 relate to using a set of quantitative hierarchical indications maintained in the priority mapping table 700 to determine the winner of a sunder event. In embodiments, in order to calculate the winning side of a sunder, a numeric priority value may be assigned to each node and group member in the cluster hierarchy. Priority values may be assigned relative to the parent group, and may be ranked in ascending order such that smaller values represent increasing priority. In embodiments, a constant value may be used to indicate particular nodes or node groups to be excluded from priority consideration. For example, a priority value of "0" may be used to denote priority exclusion. In embodiments, equal priority values within the same group may indicate equivalent preference between those members. A set of deterministic criteria may be applied to select between members that have the same priority value. As examples, the set of deterministic criteria may include the order the members are defined within the parent group, join order, a unique identifier, or other factor. As described herein, the priority values assigned to nodes within the cluster may be a persistent attribute of the cluster configuration that is known to a plurality of nodes within the cluster. In the event of a sunder event or cluster partition, the cluster infrastructure may utilize the priority values maintained in the priority mapping table 700 to assign ownership of the set of tiebreaker ownership indicators, and determine winning and losing sides. Other methods of using the set of priority values for sunder management are also possible.

FIG. 8 shows an example selection priority table 800 for a cluster of disperse nodes, according to embodiments. As described herein, aspects of the disclosure relate to the recognition that, in certain embodiments, multiple nodes within the cluster of disperse nodes may have the same priority value, and a set of deterministic criteria may be used to decide ownership of the set of tiebreaker ownership indicators and facilitate resolution of the sunder event. Accordingly, the selection priority table 800 illustrates an example selection order for compute nodes that share the same priority value within the cluster of disperse nodes. Other selection orders other than that shown in selection priority table 800 are also possible.

Figure 9:
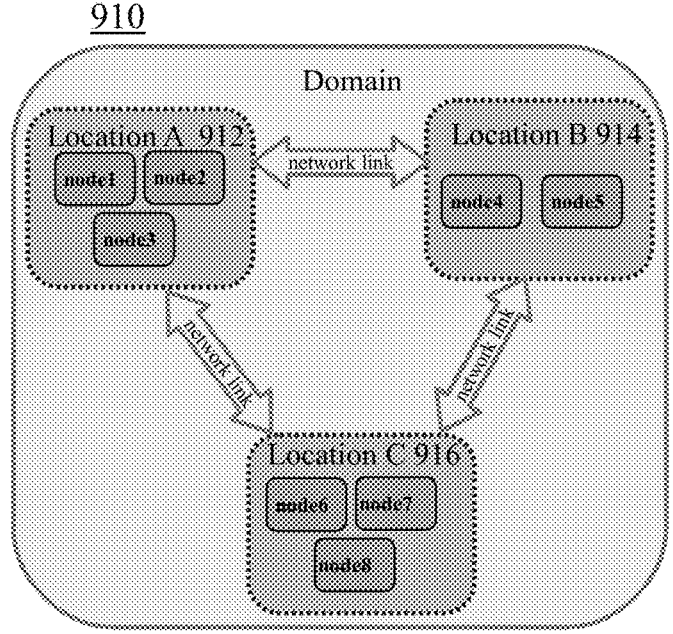
FIG. 9 illustrates an example sunder event environment, according to embodiments.

FIG. 9 illustrates an example sunder event environment 900, according to embodiments. The sunder event environment 900 may include a cluster of disperse nodes 910 and a priority configuration table 950. As shown in FIG. 9, the cluster of disperse nodes 910 may include a Location A 912, a Location B 914, and a Location C 916. The priority configuration table 950 may maintain the priority values associated with each compute node of the cluster of disperse nodes 910. As described herein, the priority configuration table 950 may be utilized to determine the node or group of nodes to be associated with the set of tiebreaker ownership indicators and assume control of cluster operations in the result of a sunder event. As an example, in certain embodiments, the priority configuration table 950 may be examined, and it may be determined that Location C is associated with a role assignment of "primary" within the cluster of disperse nodes 910. As such, a compute node within Location C may be assigned the set of tiebreaker ownership indicators. As indicated by the priority configuration table 950, both node 6 and node 7 may be associated with a priority of "1" (e.g., the highest priority value) as well as a role assignment of "primary" (e.g., preferred role status). Accordingly, as described herein, a set of deterministic criteria may be used to determine which of the two nodes will receive the set of tiebreaker ownership indicators. For instance, the node 6 and node 7 may be evaluated and compared, and it may be determined that node 6 is associated with a greater frequency of hardware failures. Accordingly, node 7 may be selected as the recipient of the set of tiebreaker ownership indicators.

In embodiments, aspects of the disclosure relate to the recognition that cluster partitions may result from a variety of different situations. Management of the set of tiebreaker ownership indicators may differ based on the nature of the cluster partition. For example, in the event of a controlled node shutdown (e.g., "graceful" partitioning), the cluster infrastructure may coordinate relocation of the tiebreaker such that the active (e.g., primary, current owner) partition does not lose ownership to an isolated (e.g., remote, standby, secondary, backup) partition. If the node associated with the set of tiebreaker ownership indicators is shut down, the set of tiebreaker ownership indicators may be relocated to the highest priority members remaining online in a coordinated protocol. In the event that an unexpected failure (e.g., "deterministic" partitioning) results in a network sunder, notifications received from remote nodes (e.g., shutdown driven broadcasts, last gasp messaging) may be used to relocate the set of tiebreaker ownership indicators to the highest priority node in the surviving partition of the cluster. Aspects of the disclosure relate to the recognition that in some unexpected node failure situations, partitions are unaware of the status of disconnected nodes (e.g., "unknown" partitioning). In embodiments, the cluster of disperse nodes 910 may make use of a temporal check-in system (e.g., heartbeat monitor) such that one or more nodes are configured to periodically (e.g., every 2 minutes, every 10 minutes, every hour) provide notification (e.g., to a central database, one or more other nodes) of its operational status. In the event that the compute node associated with the set of tiebreaker ownership indicators does not provide notification for a threshold time period, the set of tiebreaker ownership indicators may be relocated to the highest priority member of the cluster of disperse nodes 910. Other methods of managing sunder events are also possible.

Figure 10:
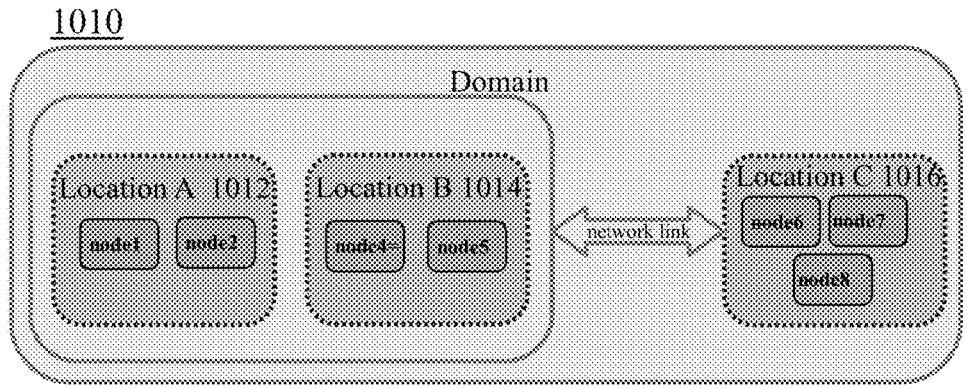
FIG. 10 illustrates an example sunder event environment, according to embodiments.

FIG. 10 illustrates an example sunder event environment 1000, according to embodiments. The sunder event environment 1000 may include a cluster of disperse nodes 1010 and a priority configuration table 1050. As shown in FIG. 10, the cluster of disperse nodes 1010 may include a Location A 1012, a Location B 1014, and a Location C 1016. In embodiments, Location A 1012 and Location B 1014 may belong to the same region (e.g., physical or logical partition), while Location C 1016 may be located remotely. The priority configuration table 1050 may maintain the priority values associated with each compute node of the cluster of disperse nodes 1010. The priority configuration table 1050 may be utilized to determine the node or group of nodes to be associated with the set of tiebreaker ownership indicators and assume control of cluster operations in the result of a sunder event. As described herein, the set of tiebreaker ownership indicators may be assigned to the compute node or nodes with the highest priority value as indicated by the priority configuration table 1050. In the event of a sunder or cluster partition, each partition (e.g., Location A 1012, Location B 1014, Location C 1016) may determine the highest priority node among its members, and the highest among all nodes that left the membership as a result of the sunder. For example, with reference to the cluster of disperse nodes 1010, a cluster of 7 nodes (e.g., [n1, n2, n3, n4, n5, n6, n7]) may be split into 4 partitions P1-P4 (e.g., [P1={n1, n2}, P2={n3}, P3={n4, n5}, P4={n6, n7}]). Each partition may designate its preferred node as a candidate to acquire the set of tiebreaker ownership indicators. After partition merges are resolved, and as new members join a partition which owns the set of tiebreaker ownership indicators, the infrastructure of the cluster of disperse nodes 1010 may relocate the tiebreaker if a higher priority via a coordinated group protocol if a higher priority node joins the cluster. Other methods of managing a sunder event are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for sunder management with respect to a shared pool of configurable computing resources having a cluster of disperse nodes, the method comprising:

defining a hierarchy for nodes within the cluster of disperse nodes, based at least in part on functionality;

determining ownership of a tiebreaker based at least in part on the hierarchy;

determining, based on a set of cluster profile data corresponding to the cluster of disperse nodes, a set of sunder event response prioritization data;

detecting, with respect to the cluster of disperse nodes, a sunder event which indicates a partitioned status;

examining the set of sunder event response prioritization data; and in response to detecting the sunder event:

referencing an archive of historical sunder event data including corresponding sunder event response operations, performing a sunder event response operation, based on: (i) the sunder event response prioritization data, (ii) information in the archive, and (iii) the tiebreaker, reclassifying a compute node, of the cluster of disperse nodes, from a first position within the hierarchy to a second position within the hierarchy, and assigning an additional network management task to the compute node;

wherein the sunder event response operation comprises swapping an asset configuration from a losing portion of the cluster of disperse nodes to a winning portion of the cluster of disperse nodes with respect to an asset operating on the cluster of disperse nodes.

2. The method of claim 1, further comprising:
establishing, in response to determining the set of sunder event prioritization data and in advance of detecting the sunder event, a set of tiebreaker ownership indicators.

3. The method of claim 2, further comprising:
redetermining, in response to detecting the sunder event, the set of sunder event response prioritization data; and
reestablishing, in response to redetermining the set of sunder event response prioritization data, the set of tiebreaker ownership indicators.

4. The method of claim 2, further comprising:
sensing, with respect to the cluster of disperse nodes, a change in a placement arrangement;
redetermining, in response to sensing the change in the placement arrangement, the set of sunder event response prioritization data; and
reestablishing, in response to redetermining the set of sunder event response prioritization data, the set of tiebreaker ownership indicators.

5. The method of claim 2, further comprising:
acquiring, by a single node of the cluster of disperse nodes, a foremost priority indicator of the set of tiebreaker ownership indicators.

6. The method of claim 2, wherein a plurality of nodes of the cluster of disperse nodes have access to the set of tiebreaker ownership indicators.

7. The method of claim 2, further comprising:
identifying, using the set of tiebreaker ownership indicators, the sunder event response operation.

8. The method of claim 1, wherein the sunder event response operation is selected from the group consisting of:
selecting a winning portion of the cluster of disperse nodes,
fencing a losing portion of the cluster of disperse nodes, and
halting a losing portion of the cluster of disperse nodes.

9. The method of claim 1, further comprising:
switching, from a lower-level role to a higher-level role, a role of a winning portion.

10. The method of claim 1, wherein the sunder event response operation includes:
swapping, with respect to an asset operating on the cluster of disperse nodes, an asset configuration from a losing portion of the cluster of disperse nodes to a winning portion of the cluster of disperse nodes.

11. The method of claim 10, further comprising:
switching, from a first linkage with the losing portion to a second linkage with the winning portion, a set of connections with the asset.

12. The method of claim 10, further comprising:
switching, from the losing portion to the winning portion, an allocation of the asset.

13. The method of claim 10, further comprising:
switching, from the losing portion to the winning portion, a role of the asset.

14. The method of claim 1, wherein the set of cluster profile data is selected from the group consisting of:
a set of computing capabilities,
a set of logical relationships,
a set of physical locations, and
a set of roles.

15. The method of claim 1, wherein the detecting, the examining, and the performing each occur in a dynamic fashion to streamline sunder management.

16. The method of claim 1, wherein the determining, the detecting, the examining, and the performing each occur in an automated fashion without user intervention.

17. The method of claim 1, further comprising:
metering use of the sunder management; and
generating an invoice based on the metered use.

18. A system for sunder management with respect to a shared pool of configurable computing resources having a cluster of disperse nodes, the system comprising:
a memory having a set of computer readable computer instructions, and
a processor for executing the set of computer readable instructions, the set of computer readable instructions including instructions to perform:
defining a hierarchy for nodes within the cluster of disperse nodes, based at least in part on functionality;
determining ownership of a tiebreaker based at least in part on the hierarchy;
determining, based on a set of cluster profile data corresponding to the cluster of disperse nodes, a set of sunder event response prioritization data;
detecting, with respect to the cluster of disperse nodes, a sunder event which indicates a partitioned status;
examining the set of sunder event response prioritization data; and
in response to detecting the sunder event:
referencing an archive of historical sunder event data including corresponding sunder event response operations,
performing a sunder event response operation, based on: (i) the sunder event response prioritization data, (ii) information in the archive, and (iii) the tiebreaker,
reclassifying a compute node, of the cluster of disperse nodes, from a first position within the hierarchy to a second position within the hierarchy, and
assigning an additional network management task to the compute node;
wherein the sunder event response operation comprises swapping an asset configuration from a losing portion of the cluster of disperse nodes to a winning portion of the cluster of disperse nodes with respect to an asset operating on the cluster of disperse nodes.

19. A computer program product for sunder management with respect to a shared pool of configurable computing resources having a cluster of disperse nodes, the computer program product comprising a computer readable storage medium having program instructions embodied therewith, wherein the computer readable storage medium is not a transitory signal per se, the program instructions executable by a processor to cause the processor to perform a method comprising:
defining a hierarchy for nodes within the cluster of disperse nodes, based at least in part on functionality;
determining ownership of a tiebreaker based at least in part on the hierarchy;
determining, based on a set of cluster profile data corresponding to the cluster of disperse nodes, a set of sunder event response prioritization data;
detecting, with respect to the cluster of disperse nodes, a sunder event which indicates a partitioned status;
examining the set of sunder event response prioritization data; and
in response to detecting the sunder event:
referencing an archive of historical sunder event data including corresponding sunder event response operations,
performing a sunder event response operation, based on: (i) the sunder event response prioritization data, (ii) information in the archive, and (iii) the tiebreaker,
reclassifying a compute node, of the cluster of disperse nodes, from a first position within the hierarchy to a second position within the hierarchy, and
assigning an additional network management task to the compute node;
wherein the sunder event response operation comprises swapping an asset configuration from a losing portion of the cluster of disperse nodes to a winning portion of the cluster of disperse nodes with respect to an asset operating on the cluster of disperse nodes.

20. The computer program product of claim 19, wherein at least one of:
the program instructions are stored in the computer readable storage medium in a data processing system, and wherein the program instructions were downloaded over a network from a remote data processing system; or
the program instructions are stored in the computer readable storage medium in a server data processing system, and wherein the program instructions are downloaded over a network to the remote data processing system for use in a second computer readable storage medium with the remote data processing system.

* * * * *